US008028368B2

(12) United States Patent
Chien

(10) Patent No.: US 8,028,368 B2
(45) Date of Patent: *Oct. 4, 2011

(54) WINDSHIELD WIPER

(75) Inventor: Ching-Chuan Chien, Taipei (TW)

(73) Assignee: Unipoint Electric Mfg. Co., Ltd., Taipei (TW)

( * ) Notice: Subject to any disclaimer, the term of this patent is extended or adjusted under 35 U.S.C. 154(b) by 595 days.

This patent is subject to a terminal disclaimer.

(21) Appl. No.: 12/217,822

(22) Filed: Jul. 9, 2008

(65) Prior Publication Data

US 2010/0005608 A1  Jan. 14, 2010

(51) Int. Cl.
*B60S 1/38* (2006.01)
*B60S 1/40* (2006.01)

(52) U.S. Cl. ............. 15/250.201; 15/250.43; 15/250.44; 15/250.451; 15/250.32

(58) Field of Classification Search ............... 15/250.43, 15/250.44, 250.201, 250.451–250.454, 250.32, 15/250.361
See application file for complete search history.

(56) References Cited

U.S. PATENT DOCUMENTS

| 2,760,220 | A  | * | 8/1956  | Deibel     | 15/250.452 |
| 7,150,066 | B1 | * | 12/2006 | Huang      | 15/250.201 |
| 7,461,429 | B2 | * | 12/2008 | Huang      | 15/250.43  |
| 2004/0181894 | A1 | * | 9/2004 | Lee et al. | 15/250.201 |

* cited by examiner

*Primary Examiner* — Gary Graham
(74) *Attorney, Agent, or Firm* — William E. Pelton, Esq.; Cooper & Dunham LLP

(57) ABSTRACT

A windscreen wiper has a rubber blade, an beam being mounted on the rubber blade, multiple clips being mounted respectively through the beam, multiple spoilers being mounted on the beam, two end caps being mounted respectively on the spoiler and around the ends of the beam and the rubber blade and a connector assembly being mounted securely on the beam and between two adjacent spoilers. The beam that is held firmly on the rubber blade, and the clips hold the beam stably on the rubber blade. Therefore, the rubber blade is connected firmly to other components of the windscreen wiper, will not deform or deteriorate easily and has improved life span.

6 Claims, 8 Drawing Sheets

US 8,028,368 B2

WINDSHIELD WIPER

BACKGROUND OF THE INVENTION

1. Field of the Invention

The present invention relates to a windshield wiper, especially to a windshield wiper that has a strengthened structure and will not deform or deteriorate easily so has improved life span.

2. Description of the Prior Arts

A windshield wiper is mounted on a windshield of a car and is pivoted back and forth over the windshield to wipe rain and dirt from the windshield to keep the windshield clean.

With reference to FIGS. 9 and 10, a conventional windshield wiper (90) comprises a rubber blade (91), two pads (92), four inner frames (93), two middle frames (94) and an outer frame (95).

The rubber blade (91) and has a back surface, two opposite sidewalls, two clip recesses (911) and two pad recesses (912). The clip recesses (911) are formed respectively and oppositely in the sidewalls of the rubber blade (91). The pad recesses (912) are formed respectively and oppositely in the sidewalls of the rubber blade (91) between the back surface of the rubber blade (91) and the clip recesses (911).

The pads (92) are mounted respectively in the pad recesses (912) of the rubber blade (91) to support and strengthen the rubber blade (91).

The inner frames (93) are mounted respectively on the back surface of the rubber blade (91). Each inner frame (93) has two ends and two clips (931). The clips (931) are mounted respectively on the ends of the inner frame (93) and clip respectively to the rubber blade (91) in the clip recesses (911) of the rubber blade (91).

The middle frames (94) are mounted respectively on the inner frames (93). Each middle frame (94) has two ends. The ends of the middle frame (94) are connected respectively to two adjacent inner frames (93).

The outer frame (95) is mounted on the middle frames (94) and has two ends. The ends of the outer frame (95) are connected respectively to the middle frames (94).

However, only the pads (92) being mounted in the pad recesses (912) of the rubber blade (91) strengthen a structure of the rubber blade (91) and the clips (931) of the inner frames (93) respectively hold the pads (92) to the rubber blade (91). The rubber blade (91) is delicate, deforms and deteriorates easily and has to be replaced frequently.

To overcome the shortcomings, the present invention provides a windshield wiper to mitigate or obviate the aforementioned problems.

SUMMARY OF THE INVENTION

The main objective of the present invention is to provide a windshield wiper that has a rubber blade, a beam being mounted on the rubber blade, multiple clips being mounted respectively through the beam, multiple spoilers being mounted on the beam, two end caps being mounted respectively on the spoiler and around the ends of the beam and the rubber blade and a connector assembly being mounted securely on the beam and between two adjacent spoilers.

The beam that is held firmly on the rubber blade, and the clips hold the beam stably on the rubber blade. Therefore, the rubber blade is connected firmly to other components of the windshield wiper, will not deform or deteriorate easily and has improved life span.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
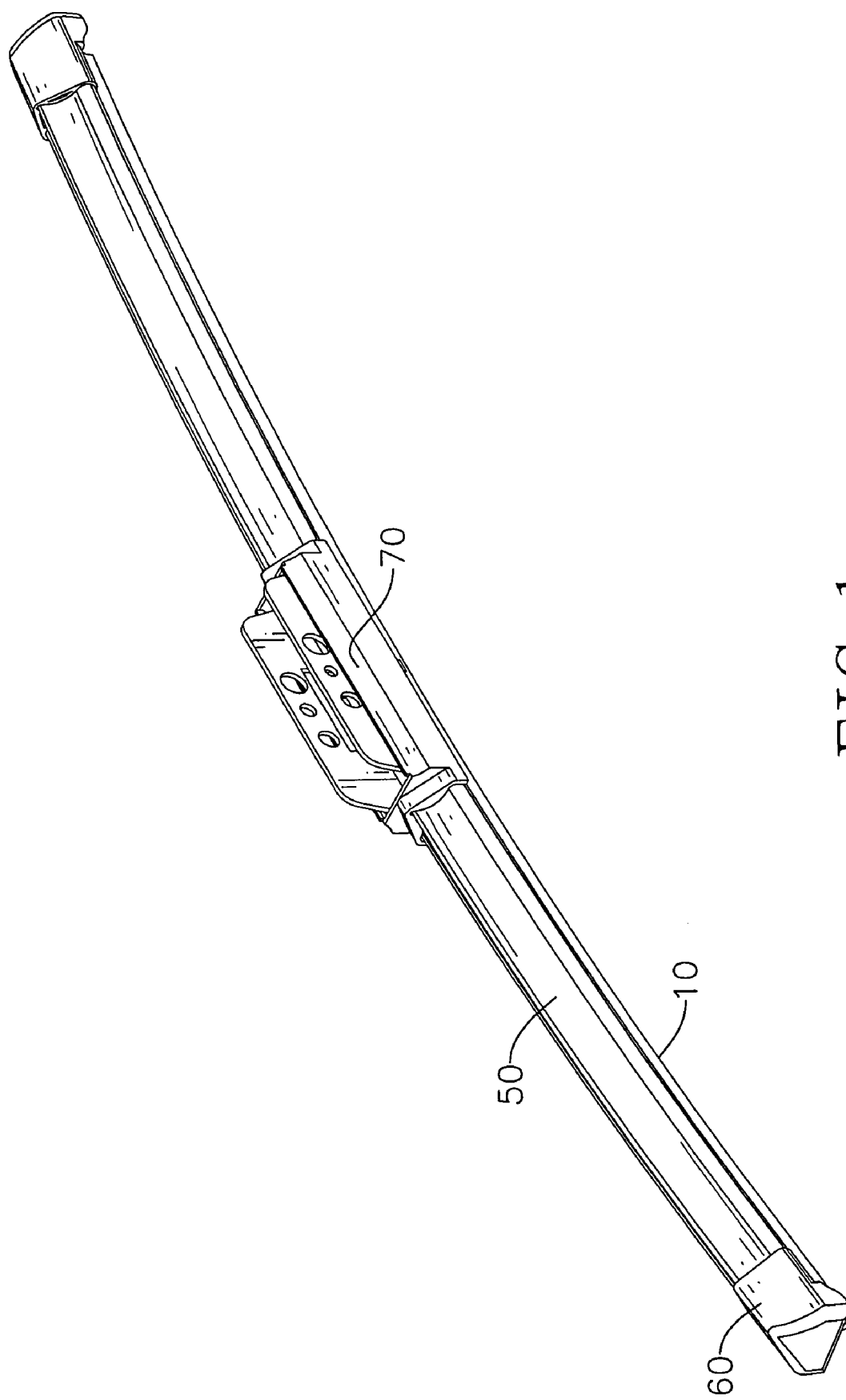
FIG. 1 is a perspective view of a windshield wiper in accordance with the present invention.
Figure 2:
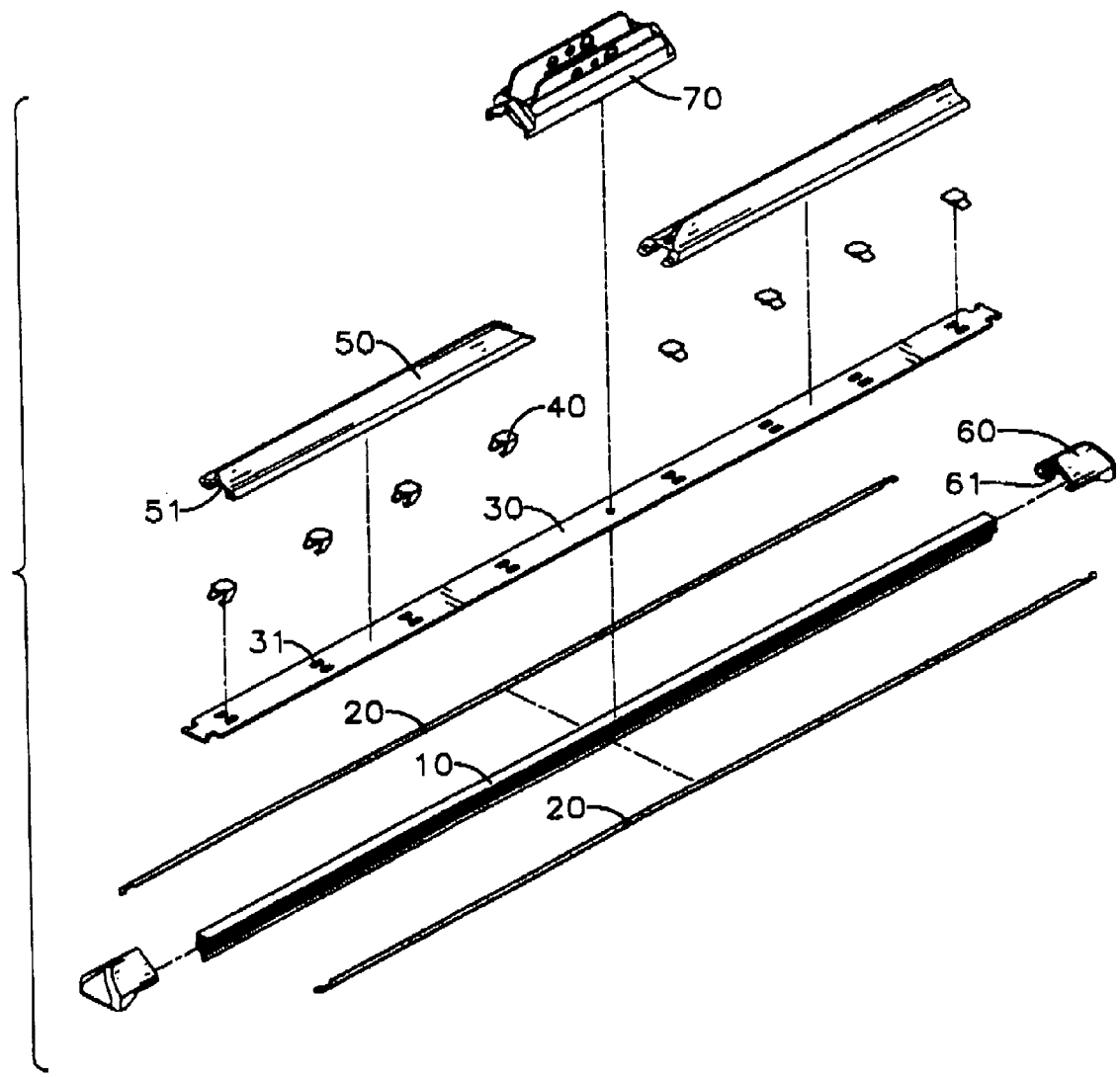
FIG. 2 is an exploded perspective view of the windshield wiper in FIG. 1.
Figure 7:
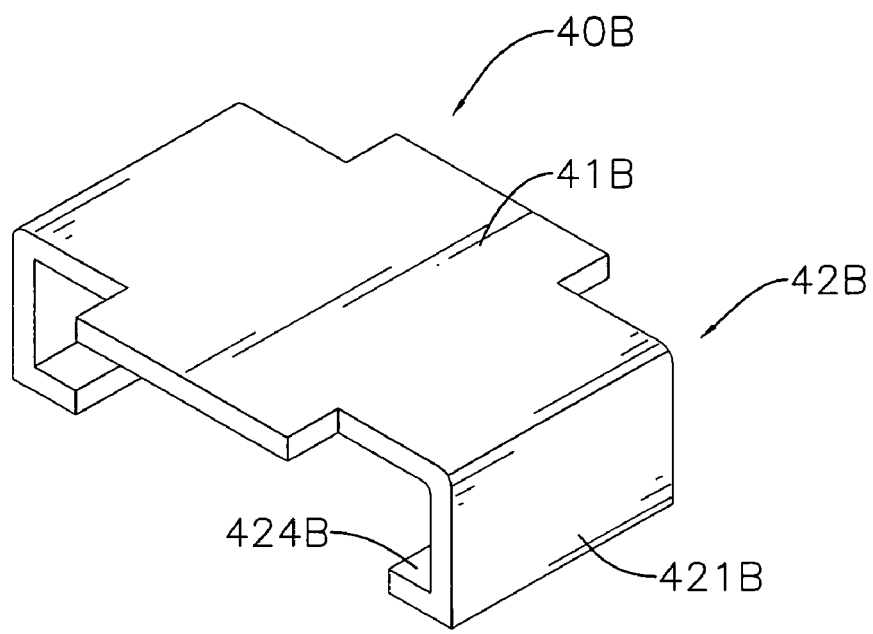
FIG. 7 is an enlarged perspective view of a second embodiment of a clip of the windshield wiper in FIG. 1.

With reference to FIGS. 1, 2 and 7, a windscreen wiper in accordance with the present invention comprises a rubber blade (10), at least one pair of pads (20), an beam (30), multiple clips (40A, 40B), multiple spoilers (50), two end caps (60) and a connector assembly (70).

Figure 3:
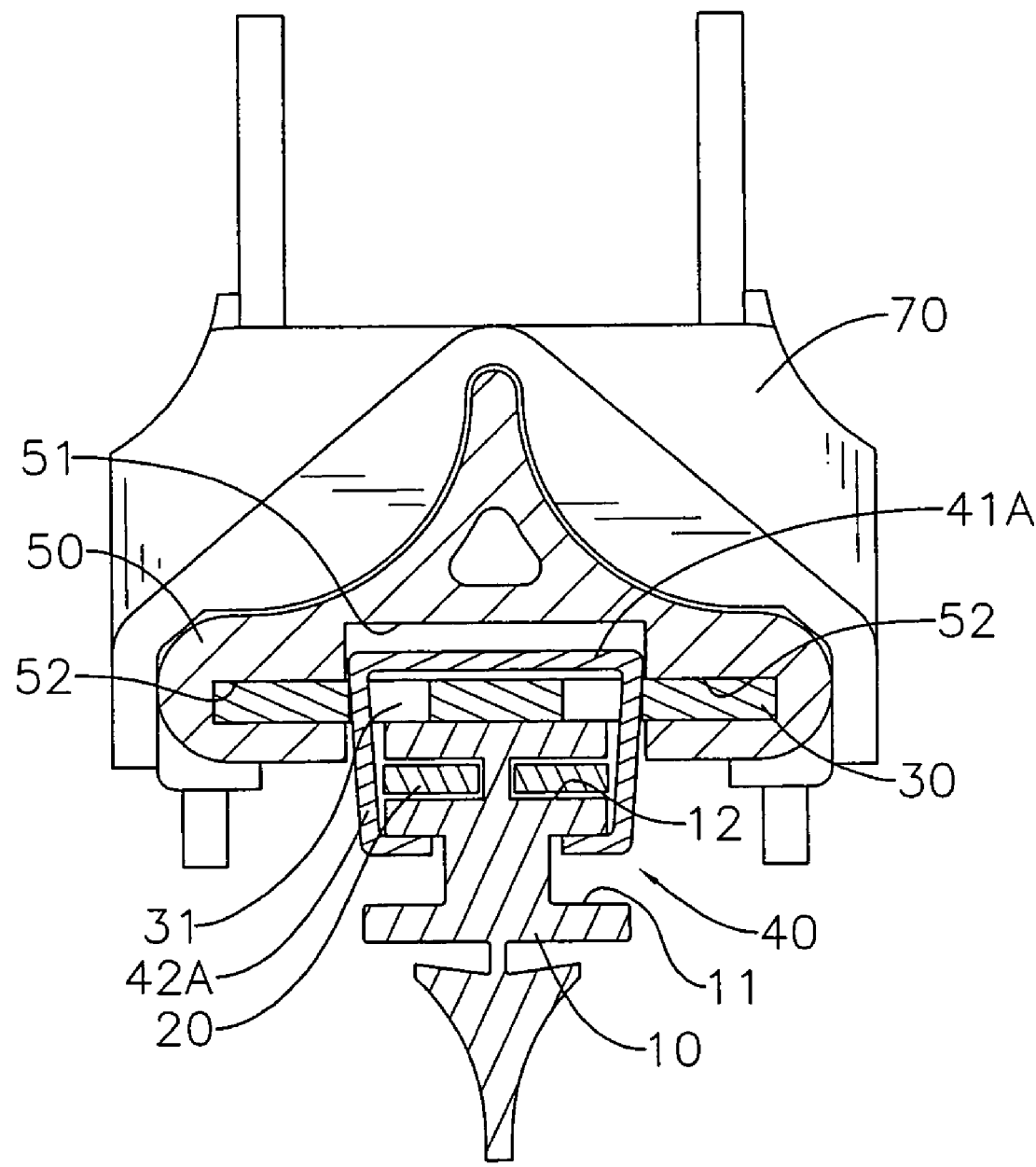
FIG. 3 is an end view in partial section of the windshield wiper in FIG. 1.

With reference to FIGS. 2 and 3, the rubber blade (10) has a back surface, two opposite sidewalls, two ends and two clip recesses (11) and may have at least one pair of pad recesses (12). The back surface of the rubber blade (10) has two opposite longitudinal edges. The clip recesses (11) are longitudinal, are formed respectively and oppositely in the sidewalls of the rubber blade (10). Each pair of the at least one pair of pad recesses (12) are longitudinal, are formed respectively and oppositely in the sidewalls of the rubber blade (10) between the clip recesses (11) and the back surface of the rubber blade (10).

Each pair of the at least one pair of pads (20) are longitudinal, are mounted respectively in the corresponding pair of the at least one pair of the pad recesses (12) of the rubber blade (10) to support and strengthen the rubber blade (10).

The beam (30) is flat, is mounted on the back surface of the rubber blade (10) and has a back surface, two opposite longitudinal edges, two ends and multiple pairs of through holes (31). Each pair of the through holes (31) are formed respectively through the beam (30) and near the longitudinal edges of the back surface of the rubber blade (10).

Figure 4:
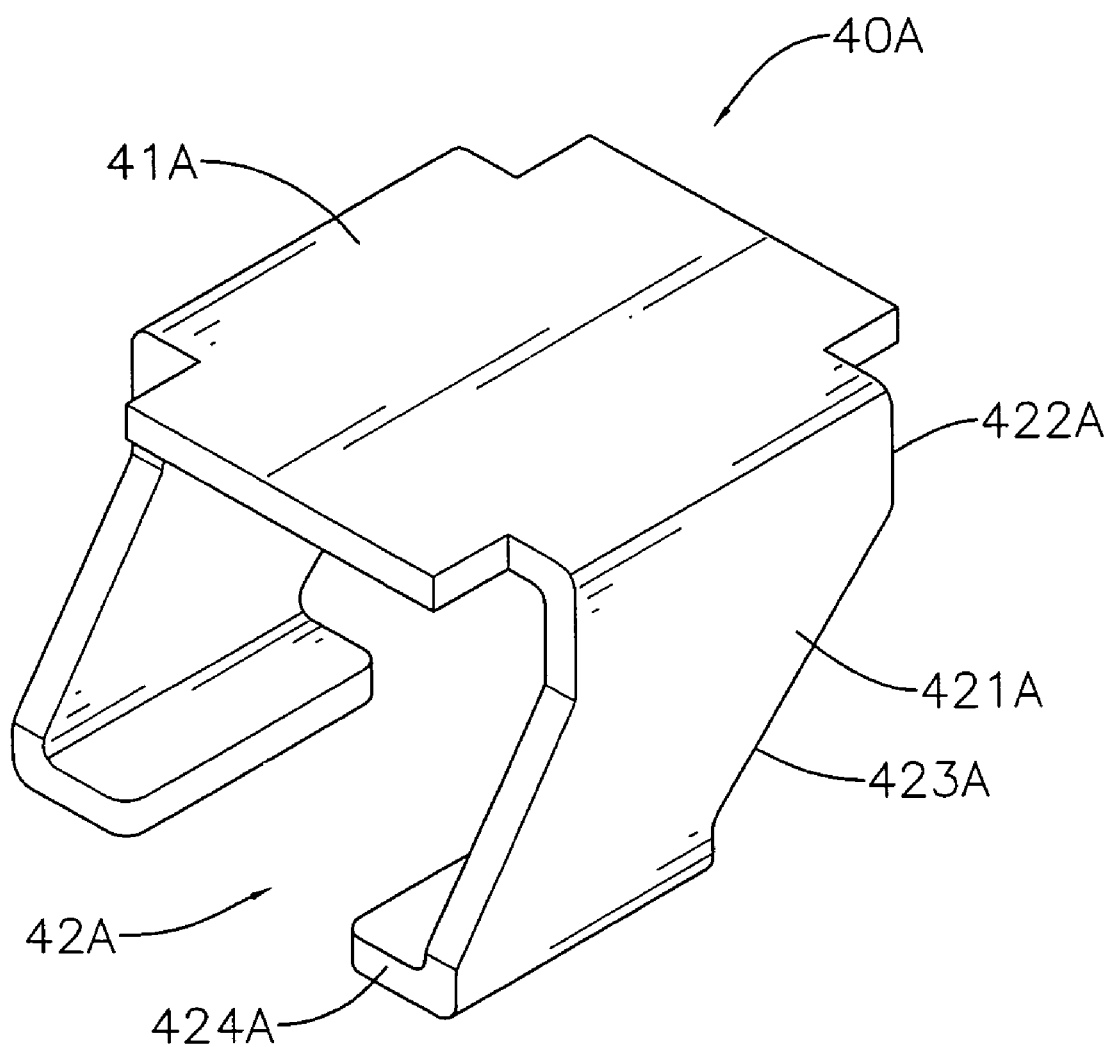
FIG. 4 is an enlarged perspective view of a first embodiment of a clip of the windshield wiper in FIG. 1.
Figure 8:
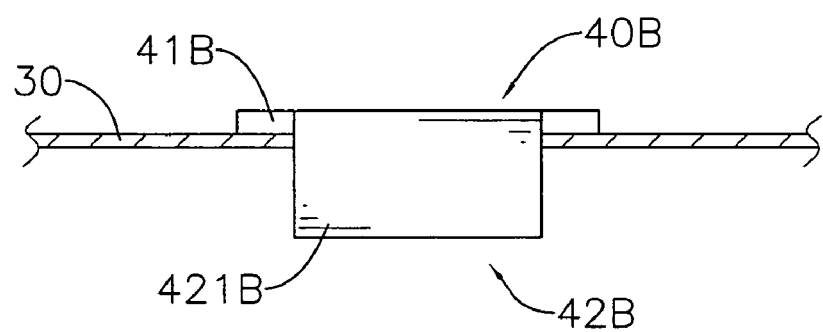
FIG. 8 is an enlarged operational side view in partial section of the windshield wiper in FIG. 1, showing the clip in FIG. 7 being mounted on the beam of the windshield wiper.
Figure 9:
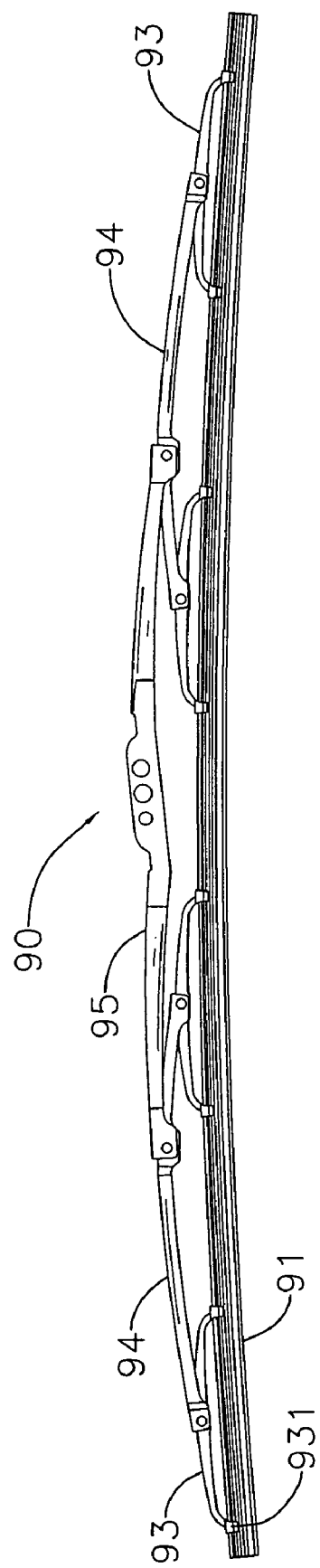
FIG. 9 is a perspective view of a conventional windshield wiper in accordance with the prior art.
Figure 10:
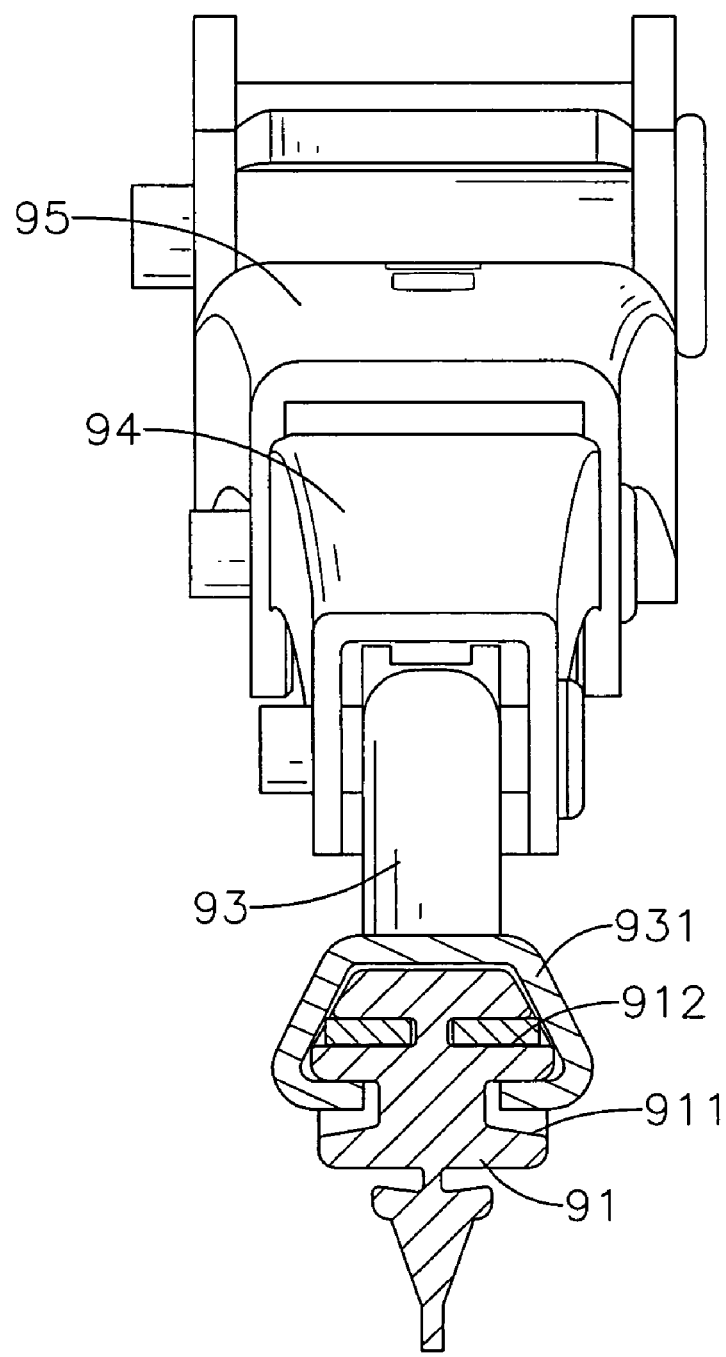
FIG. 10 is an end view in partial section of the conventional windshield wiper in FIG. 9.

With further reference to FIGS. 4, 7 and 8, the clips (40A, 40B) are mounted on the back surface of the beam (30). Each clip (40A, 40B) corresponds to one pair of the through holes (31) of the beam (30) and has a base (41A, 41B) and two clipping protrusions (42A, 42B).

The base (41A, 41B) is mounted on the back surface of the beam (30) and has two opposite side edges.

The clipping protrusions (42A, 42B) are formed on and protrude respectively and transversely from the side edges of the base (41A, 41B) of the clip (40A, 40B), are L-shaped in cross-section, are mounted respectively through the corresponding pair of the through holes (31) of the beam (30) and in the clip recesses (11) of the rubber blade (10) to hold the beam (30) stably on the rubber blade (10).

Each clipping protrusion (42A, 42B) may have a connecting wall (421A, 421B) and a holding wall (424A, 424B). The connecting wall (421A, 421B) is formed on and protrudes transversely from the corresponding side edge of the base (41A, 42B) of the clip (40A, 40B), has a distal edge and may have two upright side edges (422A) and two inclined side edges (423A). The upright side edges (422A) are opposite to each other and are connected to the corresponding side edge of the base (41A). The inclined side edges (423A) are parallel with each other and are connected respectively to the upright side edges (422A). The holding wall (424A, 424B) is formed on and protrudes transversely from the distal edge of the connecting wall (421A, 421B), may be connected to the corresponding inclined side edges (423A) of the connecting wall (421A) and is mounted in the corresponding clip recess (11) of the rubber blade (10).

Figure 5:
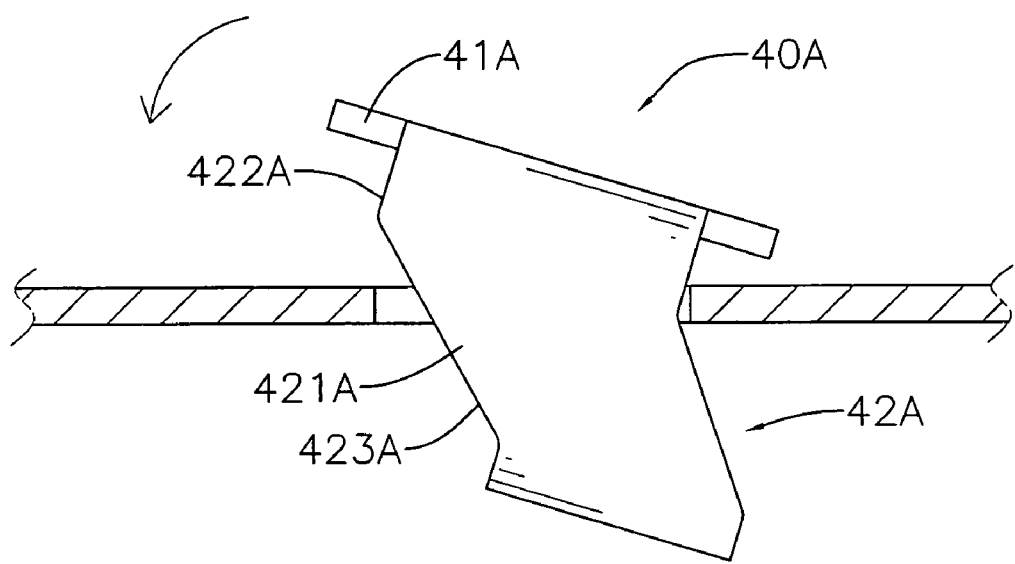
FIG. 5 is an enlarged operational side view in partial section of the windshield wiper in FIG. 1, showing the clip in FIG. 4 being mounted halfway on an beam of the windshield wiper.
Figure 6:
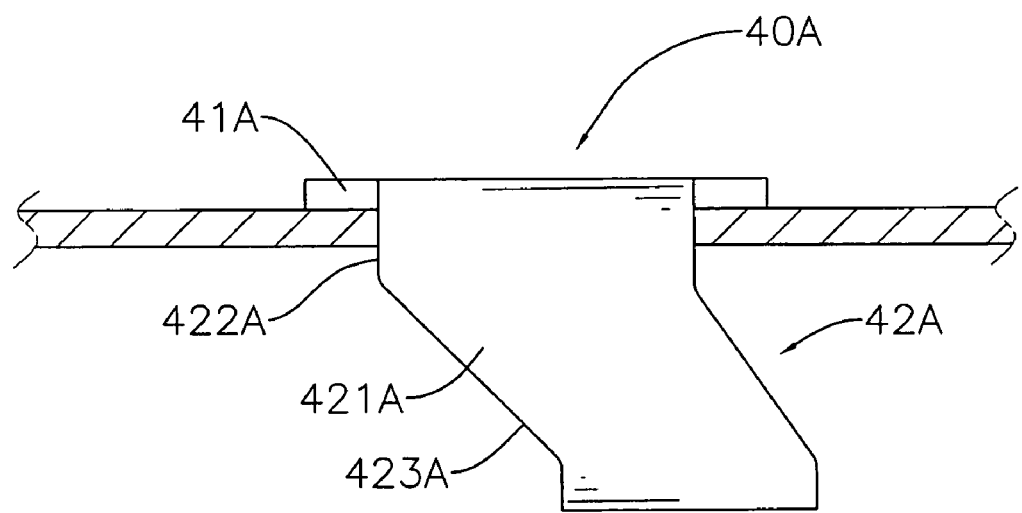
FIG. 6 is an enlarged operational side view in partial section of the windshield wiper in FIG. 1, showing the clip in FIG. 4 being mounted securely on the beam of the windshield wiper.

With further reference to FIGS. 5 and 6, when the clip (40A) is mounted into the through holes (31) of the beam (30), the clip (40A) should be slanted to allow the holding walls (424A) and the inclined side edges (423A) of the connecting walls (421A) of the clip (40A) to be mounted through the through holes (31) of the beam (30). Then, the clip (40A) is pushed to allow the upright side edges (422A) of the connecting wall (421A) of the clip (40A) to be mounted securely in the through holes (31) of the beam (30) and to allow the holding walls (424A) of the clip (40A) to be mounted in the clip recesses (11) of the rubber blade (10). Therefore, the clip (40A) will not depart from the beam (30) easily.

The spoilers (50) are triangular in cross-section and are mounted respectively on the back surface of the beam (30) for aerodynamic stability while the windscreen wiper is pivoted back and forth over a windscreen of a car. Two of the spoilers (50) respectively correspond to the ends of the beam (30). Each spoiler (50) has a bottom, a back surface, two ends, a mounting recess (51) and two positioning recesses (52). The mounting recess (51) is formed in the bottom of the spoiler (50) and has two opposite inner walls. The positioning recesses (52) are formed respectively in the inner walls of the mounting recess (51) of the spoiler (50) and are mounted respectively around the longitudinal edges of the beam (30) to hold the beam (30) and to allow the spoilers (50) to be mounted stably on the back surface of the beam (30).

The end caps (60) are mounted respectively on the ends of the spoilers (50) that correspond to the ends of the beam (30) and is mounted around the ends of the rubber blade (10) and the beam (30) to ornament and protect the ends of the rubber blade (10), the beam (30) and the spoilers (50). Each end cap (60) has an outer end, an inner end, a bottom and a mounting recess (61). The outer end of the end cap (60) is closed. The mounting recess (61) is formed in the inner end of the end cap (60) and through the bottom of the end cap (60) and is mounted on the corresponding ends of the spoilers (50) and around the ends of the rubber blade (10) and the beam (30).

The connector assembly (70) is mounted securely on the back surface of the beam (30) and between two adjacent spoilers (50), is connected pivotally to one end of an arm that is connected to the car to allow the arm sweep the windscreen wiper back and forth over the windscreen of the car and has two ends and two mounting recesses (71). The mounting recesses (71) are respectively formed in the ends of the connector assembly (70). Each mounting recess (70) corresponds to and is mounted on the back surface of the adjacent spoiler (50).

The windscreen wiper as described has the following advantages. The pads (20) and the beam (30) that are held firmly on the rubber blade (10). The clips (40A, 40B) hold the beam (30) stably on the rubber blade (10). Therefore, the rubber blade (10) is connected firmly to other components of the windscreen wiper, will not deform or deteriorate easily and has an improved life span.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A windscreen wiper comprising:
   a rubber blade and having
     two ends; and
     two clip recesses being formed respectively and oppositely in two opposite sidewalls of the rubber blade;
   a beam being mounted on a back surface of the rubber blade and having
     two ends; and
     multiple pairs of through holes, and each pair of the through holes being formed respectively through the beam;
   multiple clips being mounted on a back surface of the beam, and each clip corresponding to one pair of the through holes of the beam and having
     a base being mounted on the back surface of the beam; and
     two clipping protrusions being formed on and protruding respectively and transversely from the base of the clip, being mounted respectively through the corresponding pair of the through holes of the beam and in the clip recesses of the rubber blade and each clipping protrusion of each clip having
       a connecting wall being formed on and protruding transversely from the base of the clip and having
         two upright side edges being opposite to each other and being connected to the base of the clip; and
         two inclined side edges being parallel with each other and being connected respectively to the upright side edges; and
       a holding wall being formed on and protruding transversely from the connecting wall, being connected to the inclined side edges of a corresponding connecting wall and being mounted in a corresponding clip recess of the rubber blade;
   multiple spoilers being mounted respectively on the back surface of the beam, two of the spoilers respectively corresponding to the ends of the beam, and each spoiler having two ends;
   two end caps being mounted respectively on the ends of the spoilers that corresponding to the ends of the beam and being mounted around the ends of the rubber blade and the beam; and
   a connector assembly being mounted securely on the back surface of the beam and between two adjacent spoilers.

2. The windscreen wiper as claimed in claim 1, wherein
the rubber blade further has at least one pair of pad recesses being formed respectively and oppositely in the sidewalls of the rubber blade between the clip recesses and the back surface of the rubber blade; and
the windscreen wiper further has at least one pair of pads, and each pair of the at least one pair of pads being mounted respectively in a corresponding pair of the at least one pair of the pad recesses of the rubber blade.

3. The windscreen wiper as claimed in claim 2, wherein
each spoiler further has
  a mounting recess being formed in a bottom of the spoiler; and
  two positioning recesses being formed respectively in two opposite inner walls of the mounting recess of the spoiler and being mounted respectively around two opposite longitudinal edges of the beam;
each end cap further has
  an outer end being closed;
  a mounting recess being formed in an inner end of the end cap and through a bottom of the end cap and being mounted on the corresponding ends of the spoilers and around the ends of the rubber blade and the beam; and
the connector assembly further has
  two ends; and
  two mounting recesses being respectively formed in the ends of the connector assembly and each mounting recess corresponding to and being mounted around a back surface of the adjacent spoiler.

4. The windscreen wiper as claimed in claim 3, wherein
the beam is flat;
the clipping protrusions of the clips are L-shaped in cross-section; and
the spoilers are triangular in cross-section.

5. The windscreen wiper as claimed in claim 1, wherein
each spoiler further has
  a mounting recess being formed in a bottom of the spoiler; and
  two positioning recesses being formed respectively in two opposite inner walls of the mounting recess of the spoiler and being mounted respectively around two opposite longitudinal edges of the beam;
each end cap further has
  an outer end being closed;
  a mounting recess being formed in an inner end of the end cap and through a bottom of the end cap and being mounted on the corresponding ends of the spoilers and around the ends of the rubber blade and the beam; and
the connector assembly further has
  two ends; and
  two mounting recesses being respectively formed in the ends of the connector assembly and each mounting recess corresponding to and being mounted around a back surface of the adjacent spoiler.

6. The windscreen wiper as claimed in claim 5, wherein
the beam is flat;
the clipping protrusions of the clips are L-shaped in cross-section; and
the spoilers are triangular in cross-section.

* * * * *